(12) United States Patent
Dreasher et al.

(10) Patent No.: US 11,871,234 B2
(45) Date of Patent: Jan. 9, 2024

(54) SECURE VEHICLE TO VEHICLE PTC COMMUNICATION

(71) Applicant: Transportation IP Holdings, LLC, Norwalk, CT (US)

(72) Inventors: Rebecca W. Dreasher, Longmont, CO (US); Adam Hausmann, Melbourne, FL (US); Matthew Steven Vrba, Marion, IA (US); Edward J. Kuchar, Cedar Rapids, IA (US); James Lucas, Ponte Vedra, FL (US); Andrew Ryan Staats, Cedar Rapids, IA (US); Jerrid D. Chapman, Belle Vernon, PA (US); Jeffrey D. Kernwein, Cedar Rapids, IA (US); Janmejay Tripathy, Cedar Rapids, IA (US); Stephen Craven, Hiawatha, IA (US); Tania Lindsley, Melbourne, FL (US); Derek K. Woo, Rockledge, FL (US); Ann K. Grimm, Cedar Rapids, IA (US); Scott Sollars, Marion, IA (US); Phillip A. Burgart, Cedar Rapids, IA (US); James Allen Oswald, Coggon, IA (US); Shannon K. Struttmann, Cedar Rapids, IA (US); Stuart J. Barr, Cedar Rapids, IA (US); Keith Smith, Cedar Rapids, IA (US); Francois P. Pretorius, Paonia, CO (US); Craig K. Green, Jefferson Hills, PA (US); Kendrick Gawne, Cedar Rapids, IA (US); Irwin Morris, Marion, IA (US); Joseph W. Gorman, Cedar Rapids, IA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 261 days.

(21) Appl. No.: 17/504,086

(22) Filed: Oct. 18, 2021

(65) Prior Publication Data
US 2022/0038906 A1 Feb. 3, 2022

Related U.S. Application Data

(63) Continuation-in-part of application No. 17/458,841, filed on Aug. 27, 2021, and a continuation-in-part of
(Continued)

(51) Int. Cl.
*H04W 12/122* (2021.01)
*H04W 4/44* (2018.01)
(Continued)

(52) U.S. Cl.
CPC .......... *H04W 12/122* (2021.01); *H04W 4/44* (2018.02); *H04W 12/0431* (2021.01); *H04W 12/06* (2013.01)

(58) Field of Classification Search
CPC . H04W 12/122; H04W 4/44; H04W 12/0431; H04W 12/06
See application file for complete search history.

(56) References Cited

U.S. PATENT DOCUMENTS

| 11,153,077 B2* | 10/2021 | Dreasher | B61L 27/40 |
| 2011/0068165 A1* | 3/2011 | Dabosville | G06Q 20/3223 |
| | | | 235/487 |

(Continued)

*Primary Examiner* — Ramsey Refai
(74) *Attorney, Agent, or Firm* — The Small Patent Law Group LLC; Josef L. Hoffmann

(57) ABSTRACT

A computer-implemented method is provided that includes obtaining a first secret and a first public key, and obtaining a second secret a second public key. The method may also include authenticating the first public key of the first vehicle based on a first private key associated with the first vehicle, and authenticating the second public key of the second vehicle based on a second private key associated with the second vehicle. The method may also include preventing a
(Continued)

man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer, and sending a message, with the central office server, to a vehicle associated with a conditional movement authority.

20 Claims, 6 Drawing Sheets

Related U.S. Application Data application No. 17/443,483, filed on Jul. 27, 2021, and a continuation-in-part of application No. 17/181,667, filed on Feb. 22, 2021, and a continuation-in-part of application No. 17/174,065, filed on Feb. 11, 2021, and a continuation-in-part of application No. 16/809,248, filed on Mar. 4, 2020, now Pat. No. 11,511,782, and a continuation-in-part of application No. 16/724,449, filed on Dec. 23, 2019, now Pat. No. 11,574,261, and a continuation-in-part of application No. 16/690,152, filed on Nov. 21, 2019, now Pat. No. 11,176,811, and a continuation-in-part of application No. 16/685,485, filed on Nov. 15, 2019, now Pat. No. 11,267,496, and a continuation-in-part of application No. 16/600,147, filed on Oct. 11, 2019, now Pat. No. 11,358,618, and a continuation-in-part of application No. 16/535,966, filed on Aug. 8, 2019, now Pat. No. 11,312,390, and a continuation-in-part of application No. 16/220,959, filed on Dec. 14, 2018, now Pat. No. 11,153,077, and a continuation-in-part of application No. 16/210,883, filed on Dec. 5, 2018, now Pat. No. 11,142,229, and a continuation-in-part of application No. 16/206,674, filed on Nov. 30, 2018, said application No. 16/809,248 is a continuation-in-part of application No. PCT/US2018/049480, filed on Sep. 5, 2018.

(60) Provisional application No. 63/126,192, filed on Dec. 16, 2020, provisional application No. 63/121,111, filed on Dec. 3, 2020, provisional application No. 63/077,262, filed on Sep. 11, 2020, provisional application No. 63/056,874, filed on Jul. 27, 2020, provisional application No. 62/554,667, filed on Sep. 6, 2017.

(51) Int. Cl.
*H04W 12/06* (2021.01)
*H04W 12/0431* (2021.01)

(56) References Cited

U.S. PATENT DOCUMENTS

| | | | |
|---|---|---|---|
| 2017/0214702 A1* | 7/2017 | Moscovici | H04W 12/106 |
| 2020/0195426 A1* | 6/2020 | Dreasher | H04L 9/0838 |
| 2020/0322135 A1* | 10/2020 | Kupwade Patil | H04L 9/0847 |
| 2021/0067346 A1* | 3/2021 | Hergesheimer | H04W 4/44 |

* cited by examiner

SECURE VEHICLE TO VEHICLE PTC COMMUNICATION

CROSS-REFERENCE TO RELATED APPLICATIONS

This application is a continuation-in-part of U.S. Patent Publication No. 20200195426 which was filed on 14 Dec. 2018; and is a continuation-in-part of U.S. Patent Publication No. 20200180665 which was filed on 5 Dec. 2018; and is a continuation-in-part of U.S. Patent Publication No. 20210039668 which was filed 8 Aug. 2019; and is a continuation-in-part of U.S. Patent Publication No. 20210146973 which was filed on 15 Nov. 2019; and is a continuation-in-part of U.S. Patent Publication No. 20210107540 which was filed on 11 Oct. 2019; and is a continuation-in-part of U.S. Patent Publication No. 20210192406 which was filed on 23 Dec. 2019; and is a continuation-in-part of U.S. Patent Publication No. 20210158689 which was filed on 21 Nov. 2019; and is a continuation-in-part of U.S. Patent Publication No. 20200172131 which was filed on 30 Nov. 2018; and is a continuation-in-part of U.S. Patent Publication No. 20200198677 which was filed on 4 Mar. 2020; and is a continuation-in-part of U.S. patent application Ser. No. 17/458,841 which was filed on 27 Aug. 2021 and claims priority to U.S. Patent Application No. 63/077,262 which was filed on 11 Sep. 2020; and is a continuation-in-part of U.S. patent application Ser. No. 17/443,483 which was filed on 27 Jul. 2021 and claims priority to U.S. Patent Application No. 63/056,874 which was filed 27 Jul. 2020; and is a continuation-in-part of U.S. Patent Application No. 63/126,192 which was filed 16 Dec. 2020; and is a continuation-in-part of U.S. Patent Application No. 63/121,111 which was filed on 3 Dec. 2020; and is a continuation-in-part of U.S. patent application Ser. No. 17/181,667 which was filed on 22 Feb. 2021; and is a continuation-in-part of U.S. patent application Ser. No. 17/174,065 which was filed on 11 Feb. 2021; the entire disclosures of each which are incorporated herein by reference.

BACKGROUND

Technical Field

The present invention relates generally to systems and methods of secure key exchange between two vehicles operating within a route network, and in particular, to providing secure key exchange for communications used in establishing a local communication link between two vehicles within the route network.

Description of Related Art

At any given time within a complex route network, such as a track network, one or more vehicle, such as trains, may be operating and traversing a route in the route network and sending data from one to another using various radio-based methods. For example, a moving block is a signaling block system where blocks are defined in real time by computers to establish safe zones around a first train (e.g., a lead train, etc.) and a second train (e.g., a follower train, etc.). Further, the one or more vehicles may have on-board communication and control systems that facilitate the safe operation of the one or more vehicles in a local territory within the route network. For example, a first vehicle of the one or more vehicles on a route can listen for signals from a second vehicle of the one or more vehicles to determine a vehicle movement in a way to ensure proper separation distance to safely stop the vehicle. In this manner, an individual vehicle may be controlled and safely operated.

The use of such communications as part of a vehicle control system, including positive train control (PTC) systems may introduce cyber security issues. For example, in a man-in-the-middle attack (MITM), a malicious actor may insert oneself between two communicating vehicles (e.g., a hacker positioned within a communication range of the vehicle, etc.) in order to detect information, cause damage, or influence vehicle control. In a MITM attack, both communicating trains are made to believe by the malicious actor that they are communicating with another vehicle while the malicious actor controls the communication channel to delete or modify any of the communications at will. In addition, commercial tools are now becoming more readily available for aiding a would-be malicious actor to inject himself into the middle of vehicle-to-vehicle communications (e.g., locomotive to locomotive, etc.), thereby increasing such attacks on exploitable systems.

In a further example, a first vehicle may request vehicle information of a second vehicle by sending the request, including authentication information (e.g., a password, a one-time code from a token, etc.) to a second vehicle. In a MITM attack, a malicious actor may intercept the train-to-train communication from the first vehicle and pass it to the second vehicle. In this case, the second vehicle may then send a response to the first vehicle when it is actually sending the message to the malicious actor. In the MITM attack, after the response is intercepted by the malicious actor, the malicious actor is free to modify the response, including one or more other communications, and pass the modified response back to the first vehicle. When the first vehicle receives the modified response from the malicious actor, the first vehicle has no information to determine the actual sender (e.g., the malicious actor) and may believe (e.g., determine, etc.) that the response is a secure communication from the second vehicle. At this point, the malicious actor has gained control of the communications channel and may send any spoofed messages directly to the first vehicle and/or the second vehicle. In this attack, public keys, two-factor authentication mechanisms, mutual authentication, digital signatures, etc., are insufficient to certify that the source of the message is the trusted second vehicle, and the first vehicle may not have, nor obtain, information to determine that the message was sent from the second vehicle instead of a nefarious actor.

SUMMARY

In accordance with one embodiment, a computer-implemented method is provided that includes obtaining, with a central office server, a first secret and a first public key, and obtaining, with the central office server, a second secret a second public key. The method may also include authenticating, with the central office server, the first public key of the first vehicle based on a first private key associated with the first vehicle, and authenticating, with the central office server, the second public key of the second vehicle based on a second private key associated with the second vehicle. The method may also include preventing a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer, and sending a message, with the central office server, to a vehicle associated with a conditional movement authority.

In accordance with one embodiment, a vehicle-to-vehicle key exchange system is provided that may include a central office server comprising one or more processors. The one or more processors may be configured to obtain, from a first on-board computer of a first vehicle, a first secret and a first public key, and obtain, from a second on-board computer of a second vehicle, a second secret and a second public key. The one or more processors may also be configured to receive from the second on-board computer a digitally signed second public key based on a second private key associated with the second on-board computer, and authenticate the first public key of the first vehicle based on the first private key associated with the first on-board computer of the first vehicle. The one or more processors may also be configured to authenticate the second public key of the second vehicle based on the second private key associated with the second on-board computer of the second vehicle. In addition, the one or more processors may be configured to prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication may be authenticated based on a determined private key associated with a respective first vehicle on-board computer. The one or more processors may also be configured to send a message, with the central office server, to a vehicle associated with a conditional movement authority.

In accordance with one embodiment, a computer program product that may include at least one non-transitory computer-readable medium including program instructions. When executed by at least one processor, the at least one processors may be configured to obtain a first secret and a first public key, and obtain a second secret and a second public key. The one or more processors may also be configured to authenticate the first public key of the first vehicle based on a first private key associated with the first vehicle, and authenticate the second public key of the second vehicle based on a second private key associated with the second vehicle. The one or more processors may also be configured to prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer. The one or more processors may also be configured to send a message to a vehicle associated with a conditional movement authority.

The present invention is neither limited to nor defined by the above summary. Rather, reference should be made to the claims for which protection is sought with consideration of equivalents thereto.

DETAILED DESCRIPTION

Figure 1:
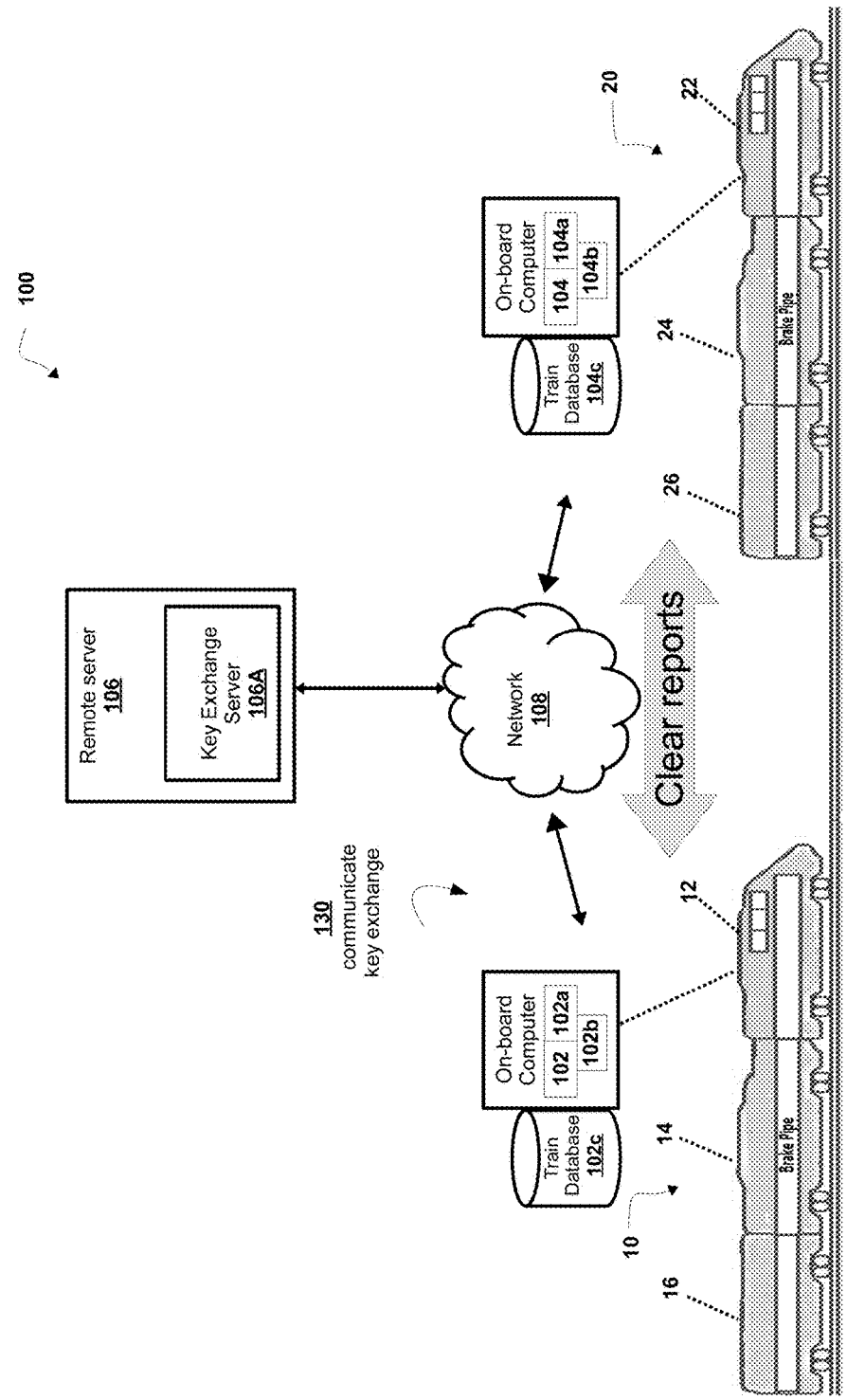
FIG. 1 illustrates a vehicle-to-vehicle key exchange system according to some non-limiting embodiments or aspects.

Two vehicles involved in a communication exchange may be vulnerable to a man-in-the-middle attack (MITM) due to limited information about one another's identities prior to establishing communication. A malicious actor may exploit such deficiencies in a communication exchange by gaining control of the communication exchange when the first vehicle cannot distinguish between communications sent by the malicious actor and the second vehicle. Vehicle control systems may not provide sufficient identifying content to authenticate communication as coming from a particular vehicle of the one or more vehicles. Additionally, the intermittent and asynchronous nature of vehicle-to-vehicle communication may provide the extra time a malicious actor needs to gain information that can be used to adequately impersonate both vehicles.

As disclosed herein, in some non-limiting embodiments or aspects, a computer-implemented method of vehicle-to-vehicle key exchange may include: generating a first secret random number and a first public key based on the first secret random number; generating a shared secret key based on a second secret random number and the first public key; authenticating an access request based on a digital signature of the first vehicle signed with a first on-board key associated with the first vehicle; and authenticating an access response based on a digital signature of the second vehicle signed with a second on-board key associated with the second vehicle. In this way, the vehicle-to-vehicle key exchange system may provide a first vehicle and a second vehicle of the two vehicles involved in a vehicle-to-vehicle communication exchange, information sufficient to acquire or more efficiently and/or securely determine the identity of another vehicle in a conversation, provide information to establish the trustworthiness of a vehicle identity, location, or other shared secret information to more efficiently and/or accurately establish communication is not susceptible to a MITM attack. In some non-limiting embodiments, the vehicle-to-vehicle key exchange system establishes sufficient identifiable context to secure a vehicle-to-vehicle message exchange by more securely and/or efficiently certifying one or more communications originating from both vehicles.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "top," "bottom," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUI) with which a user may interact, either directly or indirectly (e.g., through a keyboard, mouse, touchscreen, etc.). Further, multiple computers, servers, or other computerized devices, such as a vehicle including a vehicle computing system, directly or indirectly communicating in the network environment, may constitute a "system" or a "computing system".

It will be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

FIG. 1 is a diagram of a non-limiting embodiment of a vehicle-to-vehicle key exchange system 100 in which systems and/or methods, described herein, can be implemented. In some non-limiting embodiments of vehicle-to-vehicle key exchange system 100, vehicle system 10 includes a propulsion vehicle 12, one or more railcars 14, an end of vehicle railcar 16, and vehicle system 20 includes a propulsion vehicle 22, one or more railcars 24, and an end of vehicle railcar 26. Systems and/or devices of vehicle-to-vehicle key exchange system 100 can interconnect via wired connections, wireless connections, or a combination of wired and wireless connections.

With continued reference to FIG. 1, some non-limiting embodiments or aspects of vehicle-to-vehicle key exchange systems and methods described herein may be implemented on or in connection with an on-board computer 102 of at least one propulsion vehicle 12 in vehicle system 10, providing a communication device 102a, a display interface 102b, and a vehicle database 102c. In some non-limiting embodiments, the on-board computer 102 may be located at any position or orientation on the vehicle system 10. In some non-limiting embodiments, the on-board computer 102 (e.g., on-board controller, on-board Positive Train Control (PTC) system, vehicle management computer, and/or the like) performs the calculations for the vehicle-to-vehicle key exchange.

In some non-limiting embodiments or aspects, the on-board computer 102 provides PTC functions (e.g., vehicle management, computer displays, cab signal monitors, brake and systems interfaces, an event recorder, etc.).

In some non-limiting embodiments or aspects, vehicle database 102c provides a populated vehicle database. For example, vehicle database 102c obtains or receives data and/or information from one or more vehicles (e.g., vehicle system 20, etc.), one or more remote servers 106, one or more back office servers, one or more central dispatchers, and/or the like. In some non-limiting embodiments, vehicle database 102c provides vehicle data, such as, for example, track profile data, vehicle data, switch location information, track heading changes (e.g., curves, and distance measurements), vehicle consist information (e.g., the number of vehicles, the number of cars, the total length of the vehicle, etc.), and/or the like.

With continued reference to FIG. 1, in some non-limiting embodiments or aspects, a vehicle-to-vehicle key exchange system 100 may include two vehicles as shown in FIG. 1. By way of example, vehicle system 20 may include a propulsion vehicle 22 (e.g. a locomotive), one or more railcars 24, and an end of vehicle railcar 26. In some non-limiting embodiments, an on-board computer 104 of at least one propulsion vehicle 22 in vehicle system 20, may be the same or similar to on-board computer 102, for example, providing a communication device 104a, a display interface 104b, and a vehicle database 104c. In some non-limiting embodiments, on-board computer 104 performs the calculations for the vehicle-to-vehicle key exchange (e.g., a loco-loco communication communicated between propulsion vehicle 12 of vehicle system 10 and propulsion vehicle 22 of vehicle system 20, etc.).

In some non-limiting embodiments or aspects, the on-board computer 102 also provides or is in communication with the appropriate braking system and other software or programs to effectively implement the systems and methods according to the present invention. In some non-limiting embodiments, the on-board computer 102 receives real-time input from various vehicle control settings or components, including a positioning (e.g., navigation system, mapping system, etc.) system (e.g., a GPS receiver, at least one wheel tachometer/speed sensor, and/or the like).

In some non-limiting embodiments or aspects, the on-board computer 102 provides a communication device 102a (e.g., a data radio, a transceiver, a receiver, a communication interface, a communication component, and/or the like). In some non-limiting embodiments, communication device 102a of on-board computer 102 provides secure communications by or between vehicle system 10 and/or on-board computer 104 of vehicle system 20 (e.g., communication device 104a, etc.) and/or one or more other on-board computers associated with one or more vehicles in the railway system. In some non-limiting embodiments, on-board computer 102, on-board computer 104, and remote server 106 communicate wirelessly and/or in a "hard wired" form (e.g., over the rails of the track).

In some non-limiting embodiments or aspects, on-board computer 102 provides a visual display device 102b, such as the operator's display in the cab of the propulsion vehicle 12, or visual display device 104b of vehicle system 20. For example, visual display device 102b provides information and data via an electronic display interface to the operator of the vehicle system 10 regarding information associated with the on-board computer 102.

With continued reference to FIG. 1, in some non-limiting embodiments or aspects, a vehicle-to-vehicle key exchange system and method described herein may be implemented on or in connection with a remote server 106 (e.g., a central controller, a back office server, a remote server, central dispatch, back office PTC components, various wayside devices, such as signal or switch monitors, etc.). By way of example, in some non-limiting embodiments, remote server 106 provides key exchange server 106a for securing a communication channel associated with two vehicles in a railway network. In some non-limiting embodiments, on-board computer 102 (e.g., communication device 102a, etc.) and/or on-board computer 104 (e.g., communication device 104a, etc.) communicate with the remote server 106 to exchange information for generating a shared secret key.

In some non-limiting embodiments, vehicle-to-vehicle key exchange system 100 provides one or more key exchange messages of a key exchange protocol for establishing a secure communication (e.g., one or more secure communications, a secure communication channel, etc.) between a plurality of pairs of actors (e.g., parties, vehicles, vehicles, or any combination, etc.) in a railway. For example, the key exchange system 100 may include the following exchanges of information for generating a shared secret key between a first party and a second party, with authentication of a third party:

In some non-limiting embodiments or aspects, key exchange system 100 includes a first party generating a first secret random number and a first public key based on the first secret random number. For example, the first party generates the first public key based on a secret random number (e.g., a random number generated by on-board computer 102 etc.) and a modulus and base of a Diffie-Hellman protocol (e.g., shared secret key information, etc.).

In some non-limiting embodiments or aspects, key exchange system 100 includes a second party generating a second secret random number and a second public key based on the second secret random number. For example, the second party generates the second public key based on a second secret random number (e.g., a random number generated by on-board computer 104, etc.) and a modulus and base of a Diffie-Hellman protocol (e.g., shared secret key information, etc.), the modulus and base are identical to the modulus and base for generating the first public key by the first party.

In some non-limiting embodiments or aspects, key exchange system 100 includes the first party sending the first public key to the third party within a request message which is authenticated based on a private key associated with the first party. For example, the first party electronically signs the request message including the first public key with the private key associated with the first party, to securely communicate the secure information to the third party which possesses, obtains, or generates the private key associated with the first party. In some non-limiting embodiments, the third party authenticates the digital signature using the private key associated with the first party, after obtaining the private key associated with the first party.

In some non-limiting embodiments or aspects, key exchange system 100 includes the third party sending the first public key of the first party to the second party within a message which is authenticated based on a private key associated with the second party. For example, the third party electronically signs the request message including the first public key with the private key associated with the second party, to securely communicate the secure information to the second party which possesses, obtains, or generates the private key associated with the second party.

In some non-limiting embodiments or aspects, key exchange system 100 includes the second party sending the second public key to the third party within a message which is authenticated based on a private key associated with the second party. For example, the second party electronically signs the response message including the second public key with the private key associated with the second party, to securely communicate the secure information to the third party which possesses, obtains, or generates the private key associated with the second party. In some non-limiting embodiments, the third party authenticates the electronic signature using the private key associated with the second party, after obtaining the private key associated with the second party.

In some non-limiting embodiments or aspects, key exchange system 100 includes the third party sending the second public key to the first party. For example, third party sends the message providing the second public key, the message including the private key associated with the first party. For example, the third party electronically signs the response message including the second public key with the private key associated with the first party, to securely communicate the secure information to the first party which possesses, obtains, or generates the private key associated with the first party.

In some non-limiting embodiments or aspects, key exchange system 100 includes the first party generating a shared secret key based on the second public key and first secret random number. For example, in some non-limiting embodiments, the first party generates a shared secret key based on a first secret random number (e.g., the generated first secret random number, etc.) and a second public key. In some non-limiting embodiments, on-board computer 104 generates the second public key based on the second secret random number. In some non-limiting embodiments, the first party stores the first secret random number until obtaining the second public key to generate the shared secret key (e.g., a shared secret key of the first vehicle, etc.).

In some non-limiting embodiments or aspects, key exchange system 100 includes the second party generating a shared secret key based on a first public key and the second secret random number. For example, in some non-limiting embodiments, the second party generates a shared secret key based on a second secret random number (e.g., a generated second secret random number, etc.) after receiving the first public key. In some non-limiting embodiments, the first party generates a first public key based on the first secret random number. In some non-limiting embodiments, the second party stores the shared secret key (e.g., a shared secret key of the second vehicle, etc.).

In some non-limiting embodiments or aspects, key exchange system 100 includes authenticating a message using a shared secret key for one or more messages communicated between the first party and second party. For example, key exchange system 100 includes the first party securing a request to the second party by generating a cyclic redundancy check (CRC) over the contents of the request, and at least one of a content, timestamp, or the shared secret key (e.g. to detect changes to one or more messages, to prevent a MITM attack, etc.). Alternatively, the second party secures a request to the first party by generating a CRC over the contents of the request, and at least one of a content, timestamp, or the shared secret key.

In some non-limiting embodiments or aspects, the third party may include the remote server 106 (e.g., one or more processors of remote server 106, one or more processors of key exchange server 106a) which stores, obtains and communicates one or more key exchange message protocol communications. In some non-limiting embodiments, remote server 106 stores and or provides a vehicle electronic messaging protocol (EMP) address to another vehicle (e.g., a second vehicle's EMP address to the first vehicle, a first vehicle's EMP address to the second vehicle, etc.).

In some non-limiting embodiments or aspects, the communication network 108 includes one or more wired and/or wireless networks. For example, communication network 108 includes a cellular network (e.g., a long-term evolution (LTE) network, a third generation (3G) network, a fourth generation (4G) network, a fifth generation network (5G), a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks, such as electronic communication protocols and/or algorithms may be used including, for example, TCP/IP (including HTTP and other protocols), WLAN (including 802.11 and other radio frequency-based protocols and methods), analog transmissions, Global System for Mobile Communications (GSM), private wireless, public wireless, 160/220/900 MHz VHF, Wi-Fi, UHF 452-458 MHz, WiMAX, omni-directional, and/or the like.

In some non-limiting embodiments or aspects, the on-board computer 102 receives updates from some remote server or computer system (e.g., a central controller, a back office server, a remote server, central dispatch, dispatching system, communications server, back office PTC components, various wayside devices, such as signal or switch monitors, other on-board computers 12 in the railway system, etc.). For example, the on-board computer 102 receives updates from the remote server 106 associated with vehicle system 20 on the same track. For example, on-board computer 102 receives a message that indicates the location of vehicle system 20, and on-board computer 102 subsequently determines that vehicle system 10 and vehicle system 20 are too close together.

In some non-limiting embodiments or aspects, the on-board PTC computer calculates both the actual distance between the two vehicles as well as the safe distance between the two vehicles moving in the same direction. The on-board PTC commands the second vehicle to apply brakes to slow down or stop in order to avoid a potential collision with the first vehicle.

In some non-limiting embodiments or aspects, the on-board computer 102 of vehicle system 10 sends one or more communications to an on-board computer 104 of vehicle system 20 for position information when a vehicle is running too close, running too fast, or is present in an upcoming block of the railway. In some non-limiting embodiments, on-board computer 102 sends one or more communications to on-board computer 104 including its identification number and location information (e.g., latitude, longitude, speed, heading, location uncertainty, etc.) for maintaining an electronic radio blocking and/or conditional movement authorities.

In some non-limiting embodiments or aspects, the on-board computer 102 sends an identification and/or the like to at least one of the on-board computer 104 or the remote server 106.

In some non-limiting embodiments or aspects, the on-board computer 104 on vehicle system 20 receives the communication from the on-board computer 102 of the vehicle system 10. In some non-limiting embodiments or aspects, the remote server 106 receives the communication from the on-board computer 102 of the vehicle system 10.

In some non-limiting embodiments or aspects, the on-board computer 104 sends an identification associated with vehicle system 20, an identification associated with vehicle system 10, and/or the like to at least one of the on-board computer 102 or the remote server 106.

Figure 2:
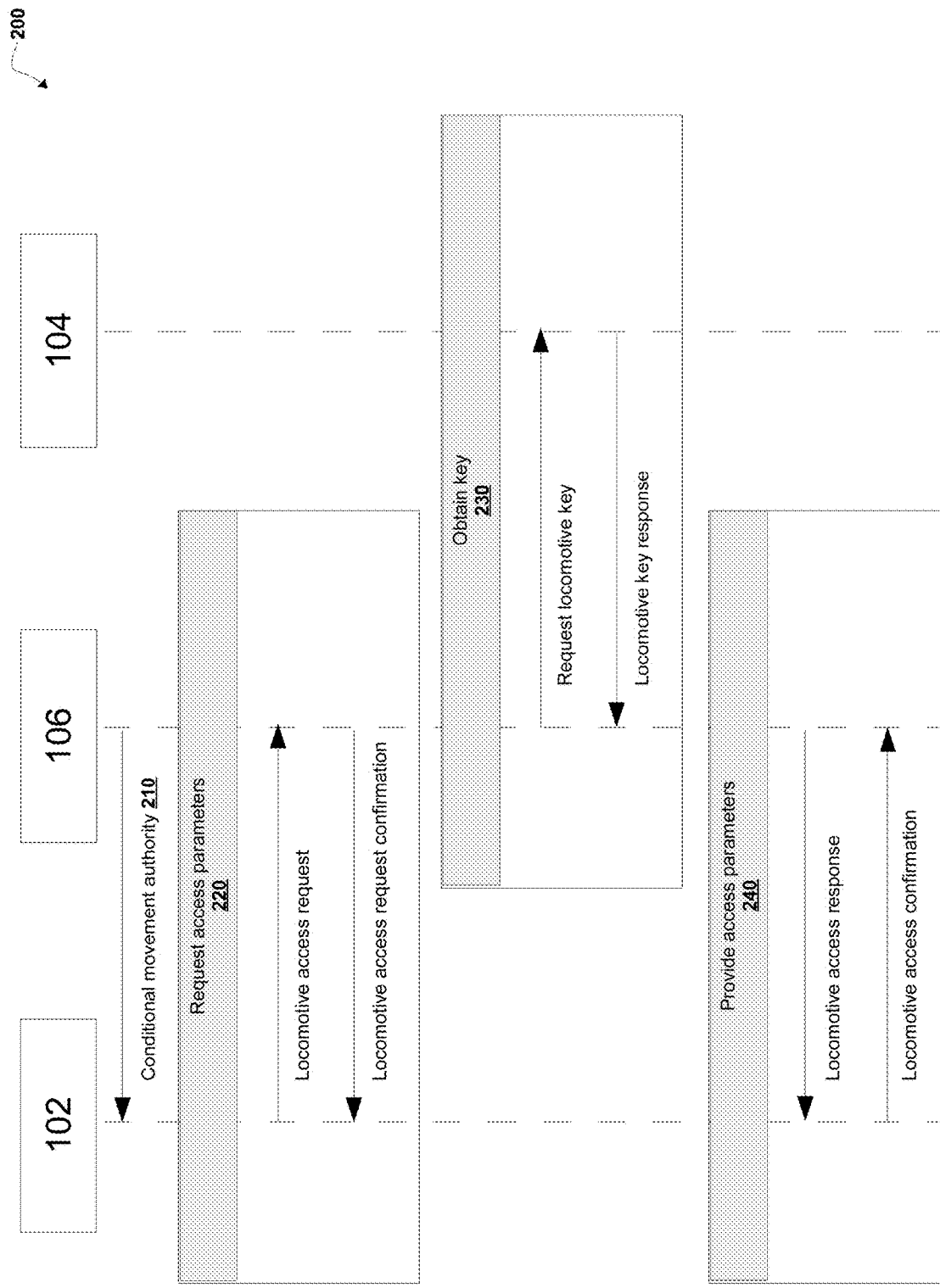
FIG. 2 illustrates a message protocol of a non-limiting embodiment or aspect of a process for communicating a key exchange.

Referring now to FIG. 2, FIG. 2 is a flow diagram of a message protocol 200 of a non-limiting embodiment or aspect for communicating a vehicle-to-vehicle key exchange. In some non-limiting embodiments, one or more of the steps of message protocol 200 are performed (e.g., completely, partially, etc.) by on-board computer 102, on-board computer 104, and/or remote server 106. In some non-limiting embodiments, one or more of the steps of message protocol 200 are performed (e.g., completely, partially, etc.) by another device or a group of devices separate from or including on-board computer 102 (e.g., one or more processors of on-board computer 102, one or more processors of communication device 102a, one or more processors of visual display device 102b, one or more processors of vehicle database 102c, etc.), on-board computer 104 (e.g., one or more processors of on-board computer 104, one or more processors of communication device 104a, one or more processors of visual display device 104b, one or more processors of vehicle database 104c, etc.), or the remote server 106 (e.g., one or more processors of remote server 106, one or more processors of key exchange server 106a, etc.).

As shown in FIG. 2, at step 210, message protocol 200 includes receiving a conditional movement authority. For example, in some non-limiting embodiments, the on-board computer 102 of vehicle system 10 receives a movement authority for first propulsion vehicle 12 (e.g., a dependent vehicle, etc.), which contains a condition based on the movement of propulsion vehicle 22 of vehicle system 20 (e.g., a constraining vehicle, etc.). In some non-limiting embodiments, the conditional authority provides a vehicle identifier of propulsion vehicle 22 of vehicle system 20 to on-board computer 102 (e.g., provides a constraining vehicle identifier to the dependent vehicle, etc.). For example, the vehicle identifier of propulsion vehicle 22 of vehicle system 20 may be associated with an address of propulsion vehicle 22 in a key exchange server 106a. In some non-limiting embodiments, the vehicle identifier of propulsion vehicle 22 of vehicle system 20 may be associated with an address (e.g., a vehicle communication network address, etc.) of propulsion vehicle 22 in a key exchange server 106a.

As shown in FIG. 2, at step 220, message protocol 200 includes requesting access parameters. For example, in some non-limiting embodiments, the on-board computer 102 is configured to send a request for access parameters. In some non-limiting embodiments, the request for access parameters provides a request for a vehicle address of propulsion vehicle 22 of vehicle system 20 to remote server 106. For example, the request for access parameters provides a vehicle identifier of the second vehicle that may be used to determine a vehicle address of propulsion vehicle 22 of vehicle system 20.

In some non-limiting embodiments or aspects, on-board computer 102 determines a public key for authenticating a communication channel with propulsion vehicle 22 of vehicle system 20. For example, on-board computer 102 generates a public key based on a secret random number (e.g., a random number generated by on-board computer 102, etc.) and shared secret key information (e.g., a modulus and base of a Diffie-Hellman protocol, etc.).

In some non-limiting embodiments or aspects, on-board computer 102 sends the access request to remote server 106 for initiating a vehicle-to-vehicle key exchange, the access request including the public key, the shared secret key information, and signed with a first vehicle on-board private key associated with first vehicle system 10 (e.g., a private key associated with propulsion vehicle 12 and known only by the remote server 106 and on-board computer 102, etc.).

In some non-limiting embodiments or aspects, the public key of the access request for parameters is associated with vehicle system 10 (e.g., a dependent vehicle, etc.). In some non-limiting embodiments, the public key associated with vehicle system 10 can decrypt one or more messages encrypted by an associated shared secret key, such as, for example, a digital signature of propulsion vehicle 12.

In some non-limiting embodiments or aspects, remote server 106 authenticates the access request for parameters based on the first vehicle private key to verify the sender of the access request for parameters of propulsion vehicle 12.

In some non-limiting embodiments or aspects, on-board computer 102 digitally signs the access request for parameters with the first vehicle private key (e.g., on-board private key, etc.) associated with vehicle system 10, and the key exchange server 106a at the remote server 106 verifies the digital signature.

In some non-limiting embodiments or aspects, remote server 106 determines a vehicle access request confirmation based on authenticating the request for access parameters. In some non-limiting embodiments, remote server 106 digitally signs a vehicle access request confirmation based on the on-board private key for propulsion vehicle 12.

As shown in FIG. 2, at step 230, message protocol 200 includes obtaining a key. For example, in some non-limiting embodiments, the remote server 106 is configured to obtain a key from a vehicle (e.g., vehicle system 20, etc.) constraining the movement of a first vehicle. For example, the remote server 106 is configured to send a request for a vehicle key and shared secret key information from the on-board computer 104 of second vehicle system 20 (e.g., the constraining vehicle, etc.).

In some non-limiting embodiments or aspects, the remote server 106 determines an address of propulsion vehicle 22 from one or more addresses of one or more vehicles in a track network based on the vehicle identifier of the second vehicle (e.g., identifies a vehicle, determines an address, etc.). For example, the remote server 106 determines an address of vehicle system 20 to send a vehicle key request. For example, in some non-limiting embodiments, the remote server 106 sends a request for a vehicle key based on determining an address of propulsion vehicle 22 associated with the vehicle identifier of propulsion vehicle 22 received from vehicle system 10.

In some non-limiting embodiments or aspects, remote server 106 digitally signs a vehicle key request based on the second vehicle private key (e.g., a private key associated with propulsion vehicle 22 and known only by the remote server 106 and on-board computer 104 of vehicle system 20, etc.).

In some non-limiting embodiments or aspects, on-board computer 104 receives the request for a vehicle key from remote server 106. In some non-limiting embodiments or aspects, on-board computer 104 authenticates the request for a vehicle key from remote server 106 by authenticating the digital signature based on the on-board private key of propulsion vehicle 22.

In some non-limiting embodiments or aspects, on-board computer 104 determines a public key after receiving the request for a vehicle key. For example, on-board computer 104 generates the public key based on a secret random number (e.g., a random number generated by on-board computer 104, etc.) and shared secret key information (e.g., a modulus and base of a Diffie-Hellman protocol, etc.).

In some non-limiting embodiments or aspects, the on-board computer 104 generates a shared secret key based on at least one of the first public key, the second public key, and/or the like. In some non-limiting embodiments, the on-board computer 104 stores one or more of the shared secret key, the first vehicle public key, the second vehicle public key, the random number generated by on-board computer 104, and/or the like.

In some non-limiting embodiments or aspects, on-board computer 104 sends a response providing a public key. For example, in some non-limiting embodiments or aspects, the vehicle system 20 sends a public key to the remote server 106 after determining the shared secret key information of vehicle system 10.

In some non-limiting embodiments or aspects, on-board computer 104 digitally signs a vehicle key response based on the second vehicle on-board private key (e.g., second vehicle private key, etc.).

In some non-limiting embodiments or aspects, key exchange server 106a of remote server 106 receives the vehicle key response from on-board computer 104 including a public key of propulsion vehicle 22. In some non-limiting embodiments or aspects, key exchange server 106a authenticates the vehicle key response from on-board computer 104 by authenticating the digital signature based on the on-board private key of propulsion vehicle 22.

As shown in FIG. 2, at step 240, message protocol 200 includes providing access parameters. For example, in some non-limiting embodiments, the key exchange server 106a of remote server 106 is configured to provide an access parameter response with a vehicle address and the second public key associated with the second vehicle system 20 to the first vehicle system 10 after the key exchange server 106a at the remote server 106 verifies the digital signature of propulsion vehicle 22 of second vehicle system 20. For example, the remote server 106 sends an access parameter response to the first propulsion vehicle 12 providing a public key of the propulsion vehicle 22 of second vehicle system 20 and a second vehicle address for communicating with propulsion vehicle 22 of second vehicle system 20.

In some non-limiting embodiments or aspects, step 240 includes providing a vehicle access confirmation. For example, in some non-limiting embodiments, on-board computer 102 receives and authenticates the access parameter response with the first vehicle private key. In some non-limiting embodiments, on-board computer 102 stores the vehicle address of the second propulsion vehicle 22 and the second public key from the key exchange server 106a. In some non-limiting embodiments, on-board computer 102 of propulsion vehicle 12 sends the vehicle access confirmation to the key exchange server 106a after receiving the access parameter response. For example, on-board computer 102 of propulsion vehicle 12 sends the vehicle access confirmation after authenticating the signed access parameter response with the first vehicle private key, after generating a shared secret key based on the second public key, after storing the vehicle address of the propulsion vehicle 22, after establishing a secure communication channel between the first propulsion vehicle 12 and the second propulsion vehicle 22, and/or the like. In some non-limiting embodiments, the vehicle access confirmation provides an indication that the vehicle access was successful, including a vehicle identifier of the first propulsion vehicle 12.

In some non-limiting embodiments or aspects, the on-board computer 102 generates a shared secret key based on receiving the second vehicle public key, the shared secret key based on at least one of the shared secret key information of vehicle system 10, the first vehicle public key, the random number generated by on-board computer 102, and/or the like. In some non-limiting embodiments, the on-board computer 102 stores one or more of the shared secret keys, the first vehicle public key, the second vehicle public key, the second secret random number generated by on-board computer 102, the vehicle address of the propulsion vehicle 22, and/or the like. In some non-limiting embodiments, on-board computer 102 of propulsion vehicle 12 sends the vehicle access confirmation to key exchange server 106a after storing the second public key and the vehicle address of the propulsion vehicle 22.

In some non-limiting embodiments or aspects, the on-board computer 102 sends a secure request (e.g., a signed request, etc.) to propulsion vehicle 22 of second vehicle system 20 (e.g., to register for clear reports, etc.) including the shared secret key. For example, in some non-limiting embodiments, the on-board computer 102 of vehicle system 10 communicates (e.g., registers with a constraining vehicle, etc.) based on a conditional authority for propulsion vehicle 12 (e.g., dependent vehicle, etc.), to receive updates from a constraining vehicle system 20 for a conditional movement based on the movement of propulsion vehicle 22 of vehicle system 20.

In some non-limiting embodiments or aspects, on-board computer 102 secures a request to on-board computer 104 (e.g., to register for clear reports, etc.) by generating a cyclic redundancy check (CRC) over the contents of the request to register and the shared secret key to detect changes to one or more messages between a first propulsion vehicle 12 and a second propulsion vehicle 22 (e.g., to detect accidental, fraudulent, nefarious changes and/or behavior, etc.). In some non-limiting embodiments, on-board computer 102 secures a request to register for clear reports by generating a cyclic redundancy check (CRC) over the contents of the request to register, a timestamp, and the shared secret key.

In some non-limiting embodiments or aspects, the on-board computer 104 of propulsion vehicle 22 authenticates the secure request from propulsion vehicle 12 to register for clear reports based on the CRC. For example, on-board computer 104 authenticates the CRC over the contents of the request to register, the shared secret key, and/or a timestamp to detect changes to one or more messages between a first propulsion vehicle 12 and a second propulsion vehicle 22.

In some non-limiting embodiments or aspects, the on-board computer 104 sends a signed response to propulsion vehicle 12 of first vehicle system 10 based on a CRC over the contents of the response to register and the shared secret key to detect changes to one or more messages between a first propulsion vehicle 12 and a second propulsion vehicle 22. In some non-limiting embodiments, on-board computer 102 of propulsion vehicle 12 sends the vehicle access confirmation to key exchange server 106a after authenticating the signed response from propulsion vehicle 22.

In some non-limiting embodiments or aspects, after confirming registration, on-board computer 104 secures one or more communications with on-board computer 102 by generating a cyclic redundancy check (CRC) over the contents of the one or more requests to register, a timestamp, and the shared secret key. In some non-limiting embodiments, on-board computer 102 secures one or more communications with on-board computer 104 by generating a cyclic redundancy check (CRC) over the contents of the one or more requests to register, a timestamp, and the shared secret key. For example, on-board computer 104, on retrieval of a new request or response, repeats a CRC calculation, and in the event the CRC values do not match, a safe and/or corrective action can be taken.

Figure 3:
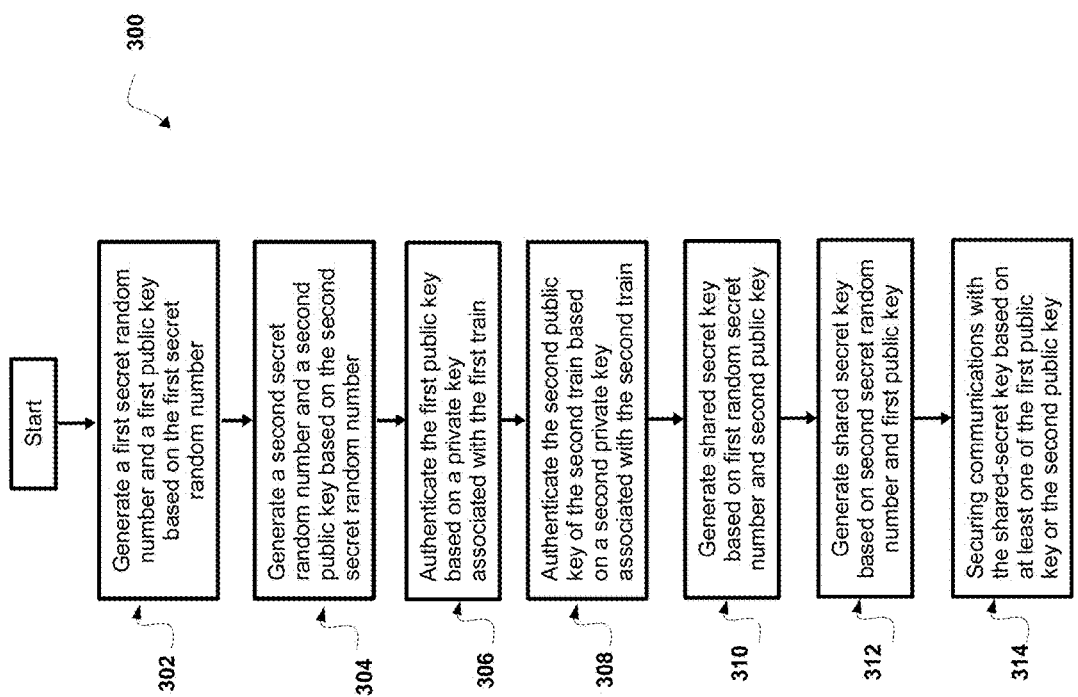
FIG. 3 illustrates a flowchart of a non-limiting embodiment or aspect of a process for vehicle-to-vehicle key exchange.

Referring now to FIG. 3, FIG. 3 is a flowchart of a non-limiting embodiment of a process 300 for a vehicle-to-vehicle key exchange. In some non-limiting embodiments, one or more of the steps of process 300 are performed (e.g., completely, partially, etc.) by on-board computer 102, on-board computer 104, and/or remote server 106. In some non-limiting embodiments, one or more of the steps of message protocol 300 are performed (e.g., completely, partially, etc.) by another device or a group of devices separate from or including on-board computer 102 (e.g., one or more processors of on-board computer 102, one or more processors of communication device 102a, one or more processors of visual display device 102b, one or more processors of vehicle database 102c, etc.), on-board computer 104 (e.g., one or more processors of on-board computer 104, one or more processors of communication device 104a, one or more processors of visual display device 104b, one or more processors of vehicle database 104c, etc.), or the remote server 106 (e.g., one or more processors of remote server 106, one or more processors of key exchange server 106a, etc.).

As shown in FIG. 3, at step 302, process 300 includes generating a first secret random number and a first public key based on the first secret random number. For example, in some non-limiting embodiments, the on-board computer 102 generates a first secret random number and a first public key based on the first secret random number.

In some non-limiting embodiments, process 300 includes receiving a vehicle identifier associated with a propulsion vehicle 22 of the second vehicle system 20 for determining the access request. For example, in some non-limiting embodiments, on-board computer 102 receives a vehicle identifier from remote server 106 associated with a propulsion vehicle 22 of the second vehicle system 20 for determining the access request. For example, the vehicle identifier is associated with a second vehicle and/or a first vehicle, for determining a vehicle address associated with the vehicle identifier at the remote server 106. In some non-limiting embodiments, on-board computer 102 receives a conditional movement authority including the vehicle identifier when receiving the second vehicle identifier associated with a second vehicle of the second vehicle in a railway.

In some non-limiting embodiments or aspects, process 300 includes generating the access request for securing messages with the vehicle identifier associated with a propulsion vehicle 22 of the second vehicle system 20. For example, in some non-limiting embodiments, on-board computer 102 generates a request for access parameters including at least a vehicle identifier associated with a second vehicle system 20 associated with the conditional movement authority including the first vehicle system 10.

In some non-limiting embodiments or aspects, process 300 includes generating and/or sending the access request by generating a request for a vehicle address associated with the vehicle identifier associated with a propulsion vehicle 22 of the second vehicle system 20.

In some non-limiting embodiments, process 300 includes sending a first vehicle address associated with a propulsion vehicle 12 of the first vehicle system 10 for determining the access response. For example, in some non-limiting embodiments, remote server 106 (e.g., central office server, etc.) sends a second vehicle address associated with a propulsion vehicle 22 of the second vehicle system 20 (e.g., a constraining vehicle, etc.) to a first vehicle system 10 for determining the access request.

As shown in FIG. 3, at step 304, process 300 includes generating a second secret random number and a second public key based on the second secret random number. For example, in some non-limiting embodiments, on-board computer 104 generates a second secret random number and a second public key based on the second secret random number. In some non-limiting embodiments, on-board computer 104 generates a second public key based on the second secret random number. In some non-limiting embodiments, the on-board computer 104 stores a shared secret key (e.g., a shared secret key of the second vehicle, etc.), generated based on the second secret random number and the first public key.

In some non-limiting embodiments, on-board computer 104 receives a first vehicle address associated with a propulsion vehicle 12 of the first vehicle system 10 for determining the access response. In some non-limiting embodiments, on-board computer 104 generates the access response for securing messages with the vehicle identifier associated with a propulsion vehicle 12 of the first vehicle system 10.

In some non-limiting embodiments, process 300 includes sending a first vehicle address associated with a vehicle of the first vehicle for determining the access response. For example, in some non-limiting embodiments, remote server 106 (e.g., central office server, etc.) sends a first vehicle address associated with a propulsion vehicle 12 of the first vehicle system 10 (e.g., dependent vehicle, etc.) to a second vehicle system 20 for determining the access response.

As shown in FIG. 3, at step 306, process 300 includes authenticating the first public key based on a first private key associated with the first vehicle. For example, in some non-limiting embodiments, key exchange server 106a authenticates the first public key based on a first vehicle private key associated with the first vehicle system 10. In some non-limiting embodiments, the key exchange server 106a authenticates an access request based on a digital signature of the first vehicle system 10 signed with a first on-board key associated with the first vehicle system 10.

In some non-limiting embodiments, process 300 includes sending a first on-board key associated with a propulsion vehicle 12 of the first vehicle system 10 for determining the access response. For example, in some non-limiting embodiments, remote server 106 (e.g., central office server, etc.) receives a first vehicle address associated with a propulsion vehicle 12 of the first vehicle system 10 (e.g., dependent vehicle, etc.) from a first vehicle system 10 for determining the access response.

In some non-limiting embodiments, remote server 106 generates a vehicle key request including a first vehicle's address, a first vehicle public key, a DH modulus, and a DH base. In some non-limiting embodiments, remote server 106 sends the message to a second propulsion vehicle 22 after signing the message with the second vehicle private key of the second vehicle.

As shown in FIG. 3, at step 308, process 300 includes authenticating the second public key of the second vehicle based on a second vehicle private key associated with the second vehicle. For example, in some non-limiting embodiments, the key exchange server 106a (e.g., central office server, etc.) authenticates the second public key of the second vehicle system 20 based on a second vehicle private key associated with the second vehicle system 20. For example, the key exchange server 106a (e.g., central office server, etc.) authenticates the second public key of the second vehicle system 20 based on the vehicle private key associated with propulsion vehicle 22.

In some non-limiting embodiments or aspects, the key exchange server 106a (e.g., central office server, etc.) digitally signs the second public key of the second vehicle system 20 before sending the digitally signed second public key to the first vehicle system 10. For example, the key exchange server 106a signs the second public key with a private key of the first propulsion vehicle 12 before sending the digitally signed second public key to the first vehicle system 10.

In some non-limiting embodiments, remote server 106 generates a vehicle key response including a second vehicle's address and public key. In some non-limiting embodiments, remote server 106 sends the message to a first vehicle after signing with a vehicle key of a propulsion vehicle 12.

In some non-limiting embodiments, the vehicle-to-central office message and the central office-to-vehicle message are authenticated based on a predetermined private key associated with a respective vehicle.

As shown in FIG. 3, at step 310, process 300 includes generating a shared secret key based on the first secret random number and the second public key authenticated by the central server. For example, in some non-limiting embodiments, on-board computer 102 generates a shared secret key based on the first secret random number and the second public key authenticated by the central server. In some non-limiting embodiments, the on-board computer 102 stores the first secret random number until obtaining the second public key to generate the shared secret key (e.g., a shared secret key of the first vehicle, etc.).

In some non-limiting embodiments or aspects, the on-board computer 102 receives the second public key and authenticates the second public key based on a vehicle private key associated with the first vehicle before generating the shared secret key (e.g., a shared secret key of the first vehicle and the second vehicle, etc.). For example, the on-board computer 102 receives the second public key after the key exchange server 106*a* digitally signs the second public key with a private key of the first propulsion vehicle 12. For example, the on-board computer 102 prevents a MITM by authenticating the second public key before generating a shared secret key.

As shown in FIG. 3, at step 312, process 300 includes generating the shared secret key based on the second secret random number and the first public key authenticated by the central server. For example, in some non-limiting embodiments, on-board computer 102 generates the shared secret key based on the second secret random number and the first public key authenticated by the central server.

In some non-limiting embodiments or aspects, the on-board computer 104 receives the first public key and authenticates the first public key based on a private key associated with the second vehicle before generating the shared secret key (e.g., a shared secret key of the first vehicle and the second vehicle, etc.). In some non-limiting embodiments, the on-board computer 102 receives the second public key after the key exchange server 106*a* digitally signs the second public key with a private key of the first propulsion vehicle 12.

For example, the on-board computer 104 prevents a MITM by authenticating the first public key before generating a shared secret key. In some non-limiting embodiments, the first vehicle system 10 (e.g., on-board computer 102, etc.) generates a first public key based on the first secret random number. In some non-limiting embodiments, the second on-board computer 104 stores the shared secret key (e.g., a shared secret key of the second vehicle, etc.).

As shown in FIG. 3, at step 314, process 300 includes securing a communication with a shared secret key based on at least one of the first public key or the second public key. For example, in some non-limiting embodiments, key exchange server 106*a* (e.g., central office server, etc.) secures a communication with a shared secret key based on at least one of the first public key or the second public key.

In some non-limiting embodiments, process 300 includes determining a shared secret key based on a public key and a secret random number. For example, on-board computer 102 and/or on-board computer 104 determines a shared secret key based on a public key and a secret random number.

In some non-limiting embodiments, process 300 includes securing at least one peer-to-peer communication channel between the first on-board computer communication device 102*a* of the first vehicle system 10 and the second on-board computer communication device 104*a* of the second vehicle system 20 based on the shared secret key. For example, on-board computer 102 secures at least one peer-to-peer communication channel between the first communication device of the first vehicle system 10 and the second communication device of the second vehicle system 20 based on the shared secret key. For example, in some non-limiting embodiments, on-board computer 102, on-board computer 104, and/or remote server 106 prevents a man-in-the-middle attack by securing (e.g., authenticating, etc.) at least one of vehicle-to-central office communication, central office-to-vehicle communication, or vehicle-to-vehicle communication.

In some non-limiting embodiments, process 300 includes communicating vehicle data and/or movement information between the first vehicle system 10 and the second vehicle system 20 via the at least one secure peer-to-peer communication channel. For example, on-board computer 102 communicates vehicle data between the first vehicle system 10 and the second vehicle system 20 via the at least one secure peer-to-peer communication channel. For example, in some non-limiting embodiments, a vehicle-to-vehicle message (e.g., peer-to-peer, vehicle-to-vehicle, etc.) is authenticated based on the shared secret key.

Figure 4A:
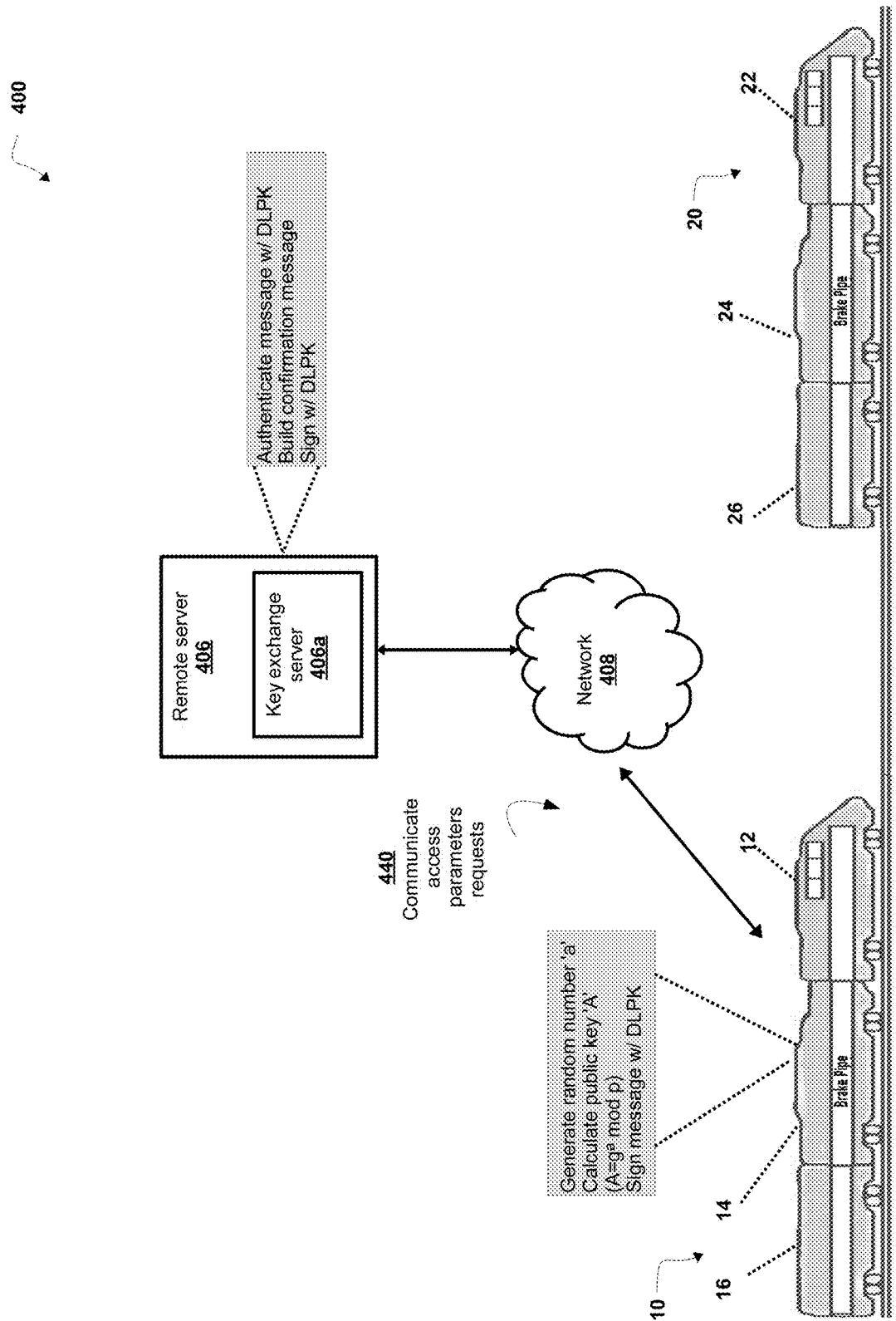
FIGS. 4A-4C illustrate an implementation of a non-limiting embodiment or aspect of a process disclosed herein according to some non-limiting embodiments or aspects.
Figure 4B:
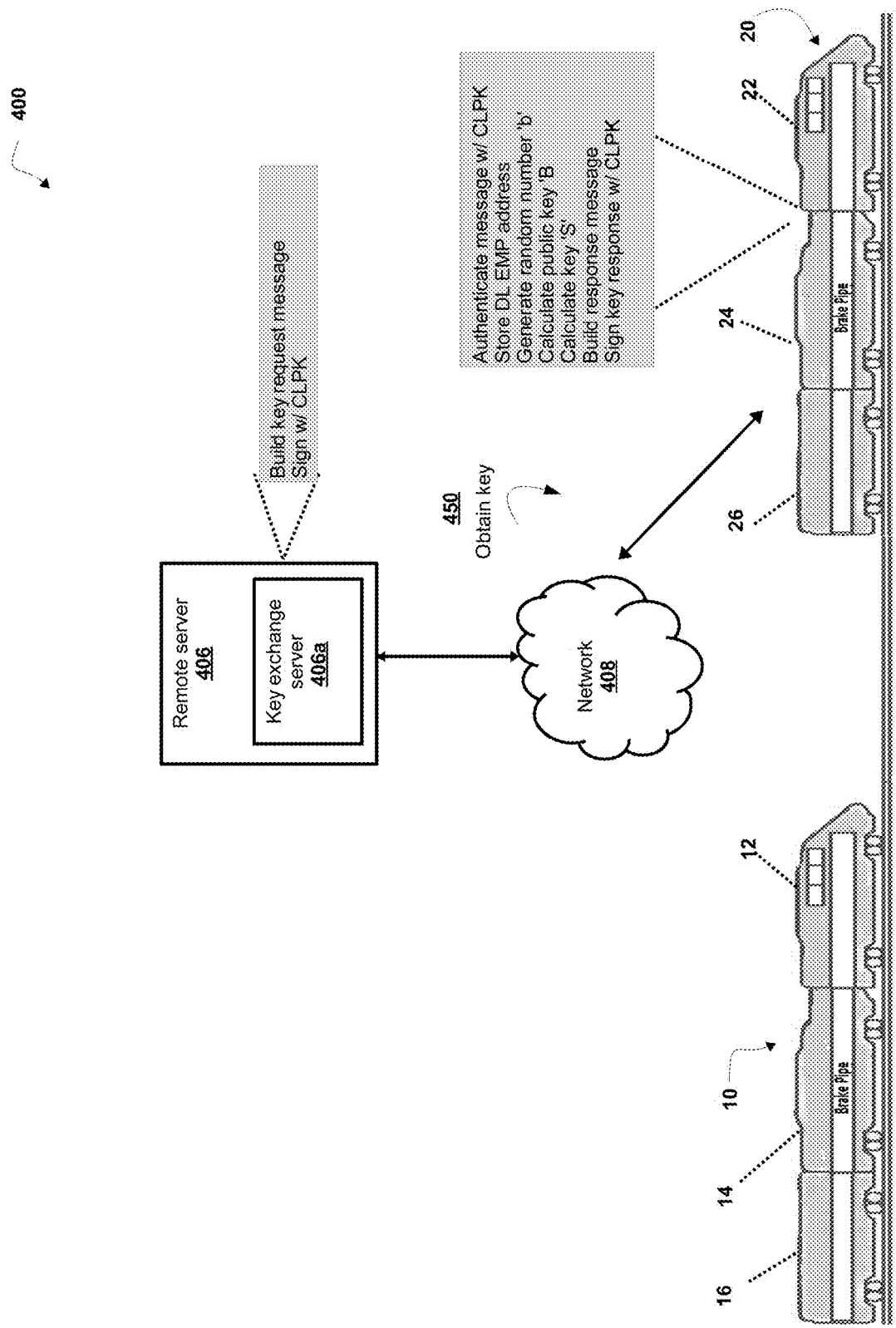
Figure 4C:
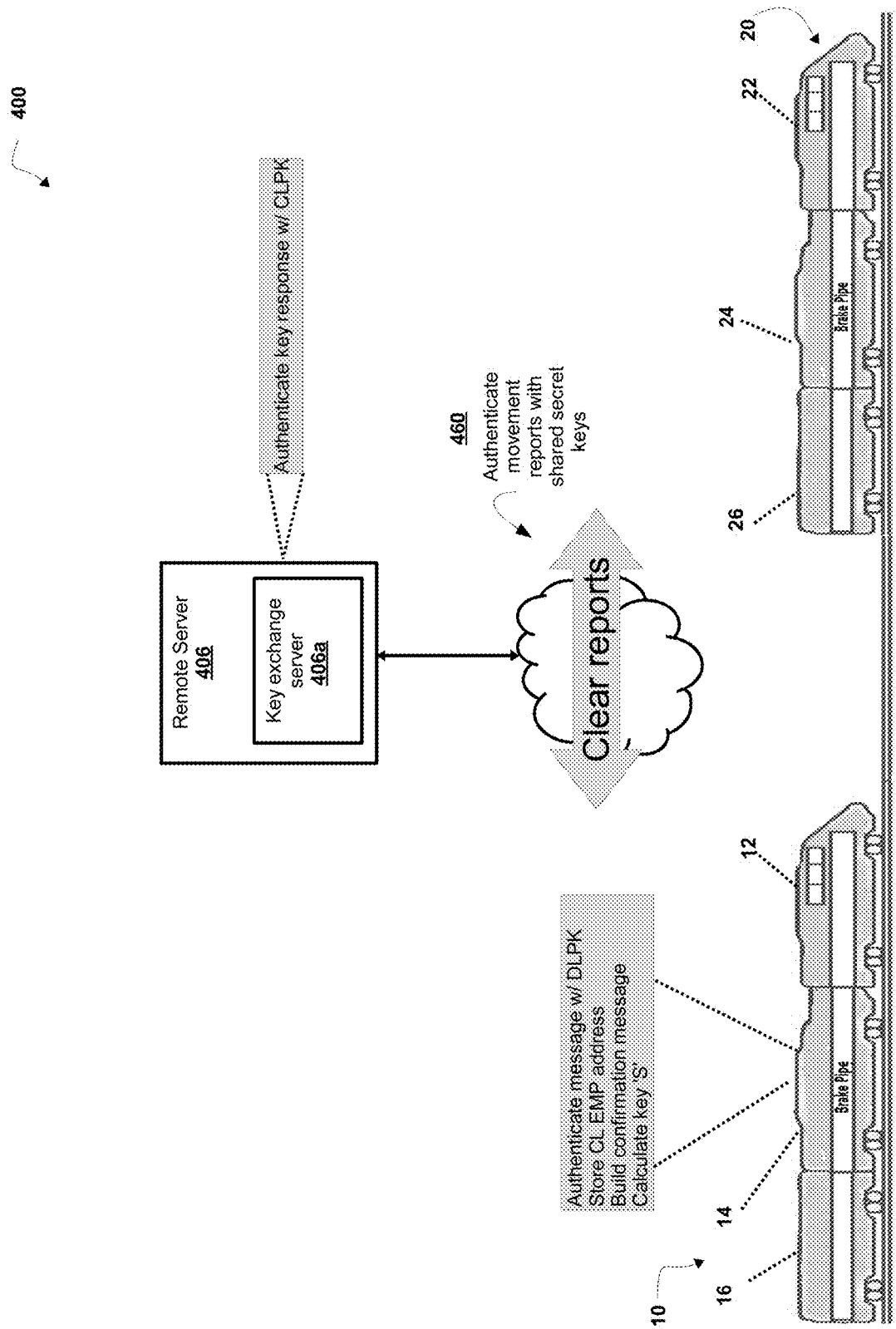

Referring now to FIGS. 4A-4C, FIGS. 4A-4C are diagrams of an overview of a non-limiting embodiment of an implementation 400 relating to one or more processes disclosed herein. As shown in FIGS. 4A-4C, implementation 400 includes vehicle system 10, propulsion vehicle 12, one or more railcars 14, an end of vehicle railcar 16, and vehicle system 20, propulsion vehicle 22, one or more railcars 24, and an end of vehicle railcar 26. Additionally, implementation 400 includes remote server 406 and key exchange system 406*a*, communicating via network 408. In some non-limiting embodiments or aspects, remote server 406 can be the same or similar to remote server 106. In some non-limiting embodiments or aspects, key exchange system 406*a* can be the same or similar to key exchange system 106*a*. In some non-limiting embodiments or aspects, vehicle system 10 and vehicle system 20 include on-board computer systems that can be the same or similar to on-board computer systems as described in FIG. 1.

As shown by reference number 440 in FIG. 4A, in some non-limiting embodiments or aspects, implementation 400 includes communicating access parameter requests. For example, in some non-limiting embodiments, propulsion vehicle 12 of vehicle system 10 communicates an access parameter request to key exchange system 406*a* or remote server 406. For example, propulsion vehicle 12 of vehicle system 10 calculates a public key based on generating a secret random number and shared secret key information. In some non-limiting embodiments, propulsion vehicle 12 of vehicle system 10 communicates the access request including the secret random number, the shared secret key information, and the public key to remote server 406 for initiating a vehicle-to-vehicle key exchange.

In some non-limiting embodiments or aspects, the public key associated with vehicle system 10 can decrypt one or more messages encrypted by a shared secret key generated in the implementation, such as, for example, a digital signature of propulsion vehicle 12. In some non-limiting embodiments, remote computer 406 authenticates the access request for parameters based on the private key of propulsion vehicle 12 to verify a sender of the access request for parameters is propulsion vehicle 12. In some non-limiting embodiments or aspects, propulsion vehicle 12 digitally signs the access request for parameters with a first vehicle on-board private key (e.g., vehicle private key, etc.) assigned to a propulsion vehicle 12 associated with vehicle system 10, and the key exchange server 106*a* at the remote server 106 verifies the digital signature.

As shown by reference number 450 in FIG. 4B, in some non-limiting embodiments or aspects, implementation 400 includes obtaining keys. For example, in some non-limiting embodiments, key exchange system 406*a* or remote server 406 communicates a request to obtain shared secret keys to propulsion vehicle 22 of vehicle system 20. For example, in some non-limiting embodiments, the remote server 406 determines an address of vehicle system 20 from one or more addresses of one or more vehicles in a track network (e.g., vehicle database 102*c*, 104*c*, and/or a vehicle database associated with the remote key exchange server 406*a*, etc.) based on the vehicle identifier of the second vehicle, and sends a request for a vehicle key to the remote server 106 based on determining an address of vehicle system 20 associated with the vehicle identifier received from vehicle system 10. In some non-limiting embodiments, remote server 106 digitally signs a vehicle key request based on the on-board private key assigned to propulsion vehicle 22.

In some non-limiting embodiments or aspects, propulsion vehicle 22 of vehicle system 20 authenticates the request for a vehicle key from remote server 106 by authenticating the digital signature based on the on-board private key for propulsion vehicle 22. In some non-limiting embodiments, propulsion vehicle 22 of vehicle system 20 generates a second vehicle public key based on a secret random number and shared secret key information associated with the public key and stores the shared secret key in an on-board database for communicating with vehicle system 10. In some non-limiting embodiments, propulsion vehicle 22 of vehicle system 20 sends the second vehicle public key to the remote server 106 after digitally signing with the on-board private key for propulsion vehicle 22.

In some non-limiting embodiments or aspects, key exchange server 106*a* authenticates the request for a vehicle key by authenticating the digital signature based on the second vehicle on-board private key.

As shown by reference number 460 in FIG. 4C, in some non-limiting embodiments or aspects, implementation 400 includes authenticating movement reports with shared secret keys. For example, in some non-limiting embodiments, implementation 400 includes vehicle system 10 and vehicle system 20 authenticating movement reports (e.g., clear reports, etc.) in a vehicle-vehicle communication (e.g., communicated between propulsion vehicle 12 of vehicle system 10 and propulsion vehicle 22 of vehicle system 20, etc.). For example, in some non-limiting embodiments, the on-board computer 104 sends a response to propulsion vehicle 12 of first vehicle system 10 to confirm a registration request for clear reports based on a CRC over the contents of the response to register and the shared secret key to detect changes (e.g., prevent a MITM attack, etc.) to one or more messages between a first propulsion vehicle 12 and a second propulsion vehicle 22. By way of example, in some non-limiting embodiments, after confirming the registration request, on-board computer 104 and/or on-board computer 102 secures one or more communications by generating a cyclic redundancy check (CRC) over the contents of the one or more requests to register a timestamp and the shared secret key, the receiving vehicle authenticating the request using a shared secret key generated on-board in the key exchange system and method.

In one or more embodiments, a computer-implemented method is provided that includes obtaining, with a central office server, a first secret and a first public key, and obtaining, with the central office server, a second secret a second public key. The method may also include authenticating, with the central office server, the first public key of the first vehicle based on a first private key associated with the first vehicle, and authenticating, with the central office server, the second public key of the second vehicle based on a second private key associated with the second vehicle. The method may also include preventing a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer, and sending a message, with the central office server, to a vehicle associated with a conditional movement authority.

Optionally, the method may also include sending, with the central office server, a vehicle identifier associated with the second vehicle for determining an access request, and receiving, with the central office server, a digitally signed first public key from the first computing device based on the first private key, wherein the first private key is assigned to the first vehicle. In one aspect, receiving the digitally signed first public key at the central office server may include receiving a request for a vehicle address of the second vehicle including a vehicle identifier associated with the second vehicle. In another aspect, obtaining, with a central office server, the first secret and a first public key may include receiving the first secret and the first public key from the conditional movement authority. In one example, the first vehicle may be a rail vehicle that can include at least one individual vehicle. The method may also include sending, with the central office server, a digitally signed first vehicle address associated with the at least one individual vehicle of the first vehicle; and preventing the man-in-the-middle attack based on the digitally signed first vehicle address.

Optionally, the method may also include sending, by the central office server, at least one of a first vehicle address associated with the first vehicle or a second vehicle address associated with the second vehicle. In one aspect, a second vehicle-to-central office communication and a central office-to-second vehicle communication may be authenticated based on a determined private key associated with a respective second vehicle on-board computer. In another aspect, the first secret may be based on a first random secret number, and the second secret is based on a second random secret number. In one example, the first secret may be based on at least one of a first DH modulus, a first DH base, or a first secret random number, and the second secret is based on at least one of a second DH modulus, a second DH base, or a second secret random number.

In one or more example embodiments, a vehicle-to-vehicle key exchange system is provided that may include a central office server comprising one or more processors. The one or more processors may be configured to obtain, from a first on-board computer of a first vehicle, a first secret and a first public key, and obtain, from a second on-board computer of a second vehicle, a second secret and a second public key. The one or more processors may also be configured to receive from the second on-board computer a digitally signed second public key based on a second private key associated with the second on-board computer, and authenticate the first public key of the first vehicle based on the first private key associated with the first on-board computer of the first vehicle. The one or more processors may also be configured to authenticate the second public key of the second vehicle based on the second private key associated with the second on-board computer of the second vehicle. In addition, the one or more processors may be configured to prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication may be authenticated based on a determined private key associated with a respective first vehicle on-board computer. The one or more processors may also be configured to send a message, with the central office server, to a vehicle associated with a conditional movement authority.

Optionally, the one or more processors may further be configured to obtain, from the first on-board computer of the first vehicle, a digitally signed first public key based on a first private key associated with the first on-board computer. In one aspect, the central office server may also be configured to send an identifier associated with the second vehicle for determining an access request, and receive the digitally signed first public key based on the first private key, wherein the first private key is assigned to the first vehicle. In another aspect, receiving the digitally signed first public key at the central office server may also include receiving a request for a vehicle address including an identifier of the second vehicle. In one example, the first secret may be based on at least one of a first DH modulus, a first DH base, or a first secret random number, and the second secret may be based on at least one of a second DH modulus, a second DH base, or a second secret random number. In another example, the central office server may also be configured to send at least one of a first vehicle address of the first vehicle or a second vehicle address associated with the second vehicle.

Optionally, the vehicle-to-vehicle key exchange system may be configured to prevent a man-in-the-middle attack, by securing at least one of a first vehicle-to-central office communication, a central office-to-first vehicle communication, or a first vehicle-to-second vehicle communication. In one aspect, the first vehicle-to-central office communications and the central office-to-first vehicle communications may be authenticated based on a predetermined private key associated with a respective vehicle on-board computer.

In one or more embodiments, computer program product that may include at least one non-transitory computer-readable medium including program instructions. When executed by at least one processor, the at least one processors may be configured to obtain a first secret and a first public key, and obtain a second secret and a second public key. The one or more processors may also be configured to authenticate the first public key of the first vehicle based on a first private key associated with the first vehicle, and authenticate the second public key of the second vehicle based on a second private key associated with the second vehicle. The one or more processors may also be configured to prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer. The one or more processors may also be configured to send a message to a vehicle associated with a conditional movement authority.

Optionally, the first vehicle-to-central office communications and the central office-to-first vehicle communications may be authenticated based on a predetermined private key associated with a respective vehicle on-board computer. In one aspect, a second vehicle-to-central office communication and a central office-to-second vehicle communication may be authenticated based on a determined private key associated with a respective second vehicle on-board computer.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

In some example embodiments, the device performs one or more processes described herein. In some example embodiments, the device performs these processes based on processor executing software instructions stored by a computer-readable medium, such as a memory and/or a storage component. A computer-readable medium (e.g., anon-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method, comprising:
   obtaining, with a central office server, a first secret and a first public key;
   obtaining, with the central office server, a second secret a second public key;
   authenticating, with the central office server, the first public key of the first vehicle based on a first private key associated with the first vehicle;
   authenticating, with the central office server, the second public key of the second vehicle based on a second private key associated with the second vehicle;
   preventing a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer; and
   sending a message, with the central office server, to a vehicle associated with a conditional movement authority.

2. The method of claim 1, comprising:
   sending, with the central office server, a vehicle identifier associated with the second vehicle for determining an access request; and
   receiving, with the central office server, a digitally signed first public key from the first computing device based on the first private key, wherein the first private key is assigned to the first vehicle.

3. The method of claim 2, wherein receiving the digitally signed first public key at the central office server further comprises: receiving a request for a vehicle address of the second vehicle including a vehicle identifier associated with the second vehicle.

4. The method of claim 2, wherein obtaining, with a central office server, the first secret and a first public key comprises: receiving the first secret and the first public key from the conditional movement authority.

5. The method of claim 1, wherein the first vehicle is part of a rail vehicle, the method also comprising: sending, with the central office server, a digitally signed first vehicle address associated with the first vehicle; and preventing the man-in-the-middle attack based on the digitally signed first vehicle address.

6. The method of claim 1, comprising: sending, by the central office server, at least one of a first vehicle address associated with the first vehicle or a second vehicle address associated with the second vehicle.

7. The method of claim 1, wherein a second vehicle-to-central office communication and a central office-to-second vehicle communication are authenticated based on a determined private key associated with a respective second vehicle on-board computer.

8. The method of claim 1, wherein the first secret is based on a first random secret number, and the second secret is based on a second random secret number.

9. The method of claim 1, wherein the first secret is based on at least one of a first DH modulus, a first DH base, or a first secret random number, and the second secret is based on at least one of a second DH modulus, a second DH base, or a second secret random number.

10. A vehicle-to-vehicle key exchange system, comprising:
    a central office server comprising one or more processors configured to:
    obtain, from a first on-board computer of a first vehicle, a first secret and a first public key; and
    obtain, from a second on-board computer of a second vehicle, a second secret and a second public key; and
    receive from the second on-board computer a digitally signed second public key based on a second private key associated with the second on-board computer;
    authenticate the first public key of the first vehicle based on the first private key associated with the first on-board computer of the first vehicle;
    authenticate the second public key of the second vehicle based on the second private key associated with the second on-board computer of the second vehicle;
    prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer;

send a message, with the central office server, to a vehicle associated with a conditional movement authority.

11. The system of claim 10, the one or more processors further configured to obtain, from the first on-board computer of the first vehicle, a digitally signed first public key based on a first private key associated with the first on-board computer.

12. The system of claim 11, wherein the central office server is further configured to:

send an identifier associated with the second vehicle for determining an access request; and receive the digitally signed first public key based on the first private key, wherein the first private key is assigned to the first vehicle.

13. The system of claim 10, wherein receiving the digitally signed first public key at the central office server further comprises: receiving a request for a vehicle address including an identifier of the second vehicle.

14. The system of claim 10, wherein the first secret is based on at least one of a first DH modulus, a first DH base, or a first secret random number, and the second secret is based on at least one of a second DH modulus, a second DH base, or a second secret random number.

15. The system of claim 10, wherein the central office server is further configured to: send at least one of a first vehicle address of the first vehicle or a second vehicle address associated with the second vehicle.

16. The system of claim 10, wherein the vehicle-to-vehicle key exchange system is configured to prevent a man-in-the-middle attack, by securing at least one of a first vehicle-to-central office communication, a central office-to-first vehicle communication, or a first vehicle-to-second vehicle communication.

17. The system of claim 16, wherein the first vehicle-to-central office communications and the central office-to-first vehicle communications are authenticated based on a predetermined private key associated with a respective vehicle on-board computer.

18. A computer program product comprising at least one non-transitory computer-readable medium including program instructions that, when executed by at least one processor, obtain a first secret and a first public key; and obtain a second secret and a second public key;

authenticate the first public key of the first vehicle based on a first private key associated with the first vehicle;

authenticate the second public key of the second vehicle based on a second private key associated with the second vehicle;

prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer; and send a message to a vehicle associated with a conditional movement authority.

19. The computer program product of claim 18, wherein the first vehicle-to-central office communications and the central office-to-first vehicle communications are authenticated based on a predetermined private key associated with a respective vehicle on-board computer.

20. The computer program product of claim 19, wherein a second vehicle-to-central office communication and a central office-to-second vehicle communication are authenticated based on a determined private key associated with a respective second vehicle on-board computer.

* * * * *